July 24, 1934.  D. A. SMITH  1,967,976
HOE CULTIVATOR
Filed Nov. 14, 1932
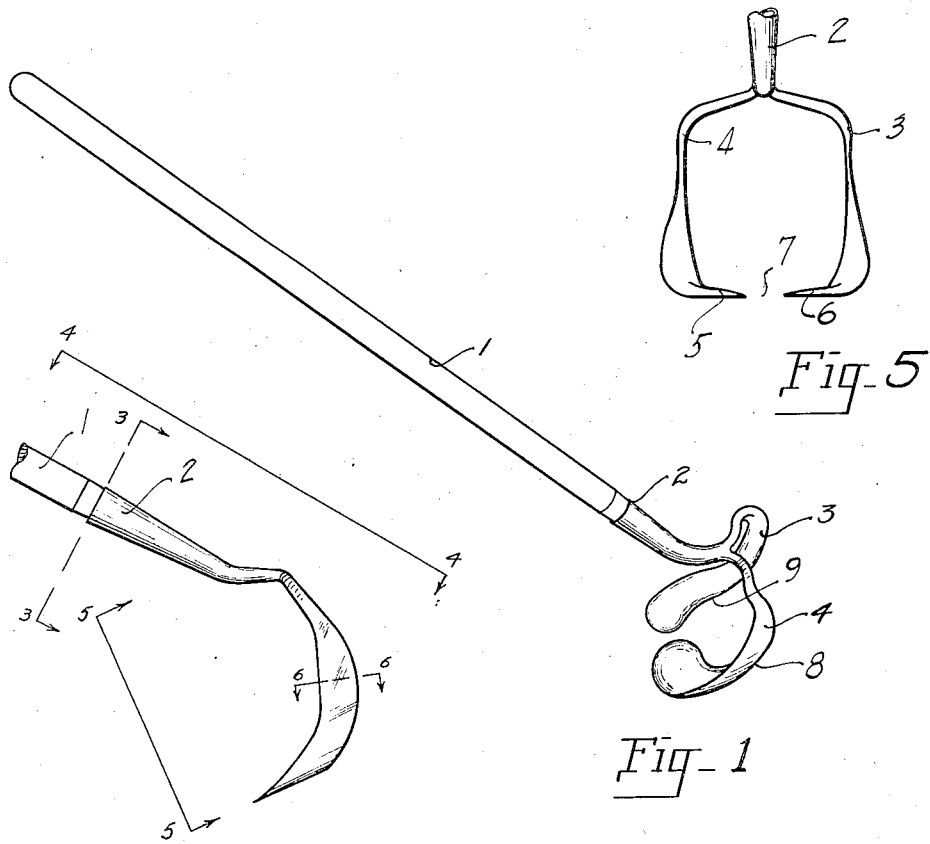
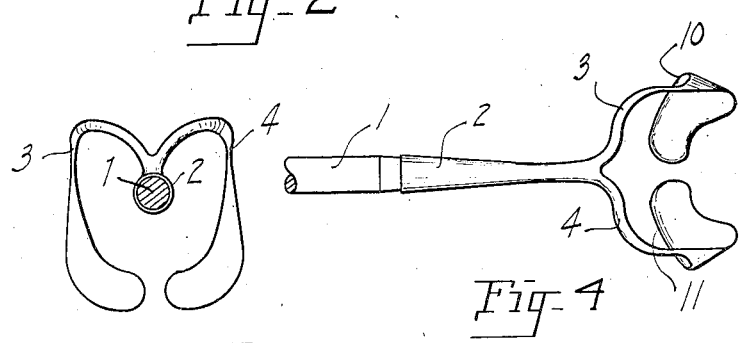
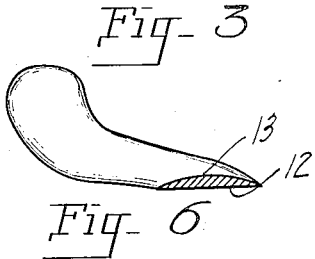
INVENTOR
DAVID A. SMITH
BY
ATTORNEY Patented July 24, 1934

1,967,976

UNITED STATES PATENT OFFICE 1,967,976

HOE CULTIVATOR

David A. Smith, Salem, Oreg.

Application November 14, 1932, Serial No. 642,515

2 Claims. (Cl. 97—63)

My invention is primarily intended for use as a hoe, cultivator, weeder and cutter. It may be used as a push, or pull hoe with equal facility. It may be used for hilling the row, for the forming of furrows and for the cutting of runners, vines and weeds.

The blades are so made and double edged that they have a maximum range of utility. The invention is comprised of a shank having a bifurcated head. The shank is adapted for having a handle inserted therein in the usual manner. The blades are flat on one surface and the oppositely disposed surface is curved.

The terminal ends of each of the blades form segments of circles, and the terminal ends are spaced apart. The two blades adjacent their ends lie in a common plane and a portion of the exterior surface of each of the blades is disposed substantially at right angles to the bottom flat portions and the bottom and side portions are connected together by relatively large curved portions to produce a tool having maximum utility.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective side view of a garden tool having a pair of my new and improved blades forming the head that is to be used in the form of a hoe.

Fig. 2 is a side view of the head and a fragmentary side view of the handle as illustrated in Fig. 1.

Fig. 3 is a sectional, end view of the assembled head. This view is taken on line 3—3 of Fig. 2, looking in the direction indicated.

Fig. 4 is a top plan view of the head as illustrated in Figs. 1 to 3 inclusive. This view is taken on line 4—4 of Fig. 2 looking in the direction indicated.

Fig. 5 is a partially inverted plan view of a head assembly as illustrated in Fig. 2. This view is taken on line 5—5 of Fig. 2, looking in the direction indicated.

Fig. 6 is a fragmentary sectional, plan view of one side of the head. This view is taken on line 6—6 of Fig. 2, looking in the direction indicated.

Like reference characters refer to like parts throughout the several views.

My device is primarily adapted for use as a cultivator and as a hoe, but it may be used with equal facility for the hilling of a row and for the cutting of vines, runners, weeds and the like. It may be used as a push hoe and as a pull hoe, and it may be used as a side cutter.

The device is primarily comprised of a handle 1. The handle is fitted into a hollow shank 2. The shank is bifurcated into two side blade members 3 and 4. The two bottom cutting portions of the side blades are substantially horizontal when the tool is in its normal position of use as illustrated at 5 and 6, and the points are slightly spaced apart as illustrated at 7. The forward edges of each blade are knife edges as illustrated at 8 and 9, and the rear edges of each blade are formed into cutting knife edges as illustrated at 10 and 11.

The tool may be used as a cultivator with both blades cutting, and when so used may be either pushed or pulled, or the tool may be turned on either side and one of the cutting blades be used either as a pull hoe or a push hoe.

In cultivating strawberries and similar vegetation the runners or any other deleterious surface growth may be cut when using the tool as a push or pull hoe, or the tool may be used in a substantially vertical position and used for cutting runners. The bottom and outside surfaces of each of the blades is substantially flat as illustrated at 12, and the inside surface is curved as illustrated at 13. The terminal ends of the blades as illustrated in Figs. 1 to 6 inclusive are curved at the terminal edges as illustrated at 14 and 15, and all of the terminal edges of the blade portion of the device are formed into cutting edges to facilitate the ease of operation of the device.

While the form of mechanism herein shown and described is admirably adapted to fulfill the objects primarily stated, it is to be understood that it is not intended to confine the invention to the one embodiment herein shown and described, as it is susceptible of embodiment in various forms all coming within the scope of the claims which follow.

What I claim is:

1. A cultivating tool of the class described, comprising a handle bifurcated at one of its ends into a pair of upwardly and forwardly extending arms, said arms being rounded up to a point approximately midway their length and flattened for the remainder of their length, said flattened portions extending downwardly at right angles to the rounded portion and thence inwardly toward the longitudinal center line of the handle, said flattened portion of each arm being formed with knife edges along both of its sides and around its end.

2. A cultivating tool of the class described, comprising a handle receiving socket, a pair of arms formed integral with the socket and diverging outwardly and upwardly therefrom, said arms being rounded up to a point substantially midway their length and flattened for the remainder of their length, the flattened portions of said arms being formed with knife edges along both of their sides and around their ends, said flattened portions of the arms extending downwardly from the upturned portion and terminating in opposed ends formed at right angles to the arms.

DAVID A. SMITH.